Oct. 31, 1967 A. LICHOWSKY 3,350,143
SLIDE BEARING EMPLOYING A FLUOROCARBON LUBRICANT
Filed March 17, 1965 2 Sheets-Sheet 1
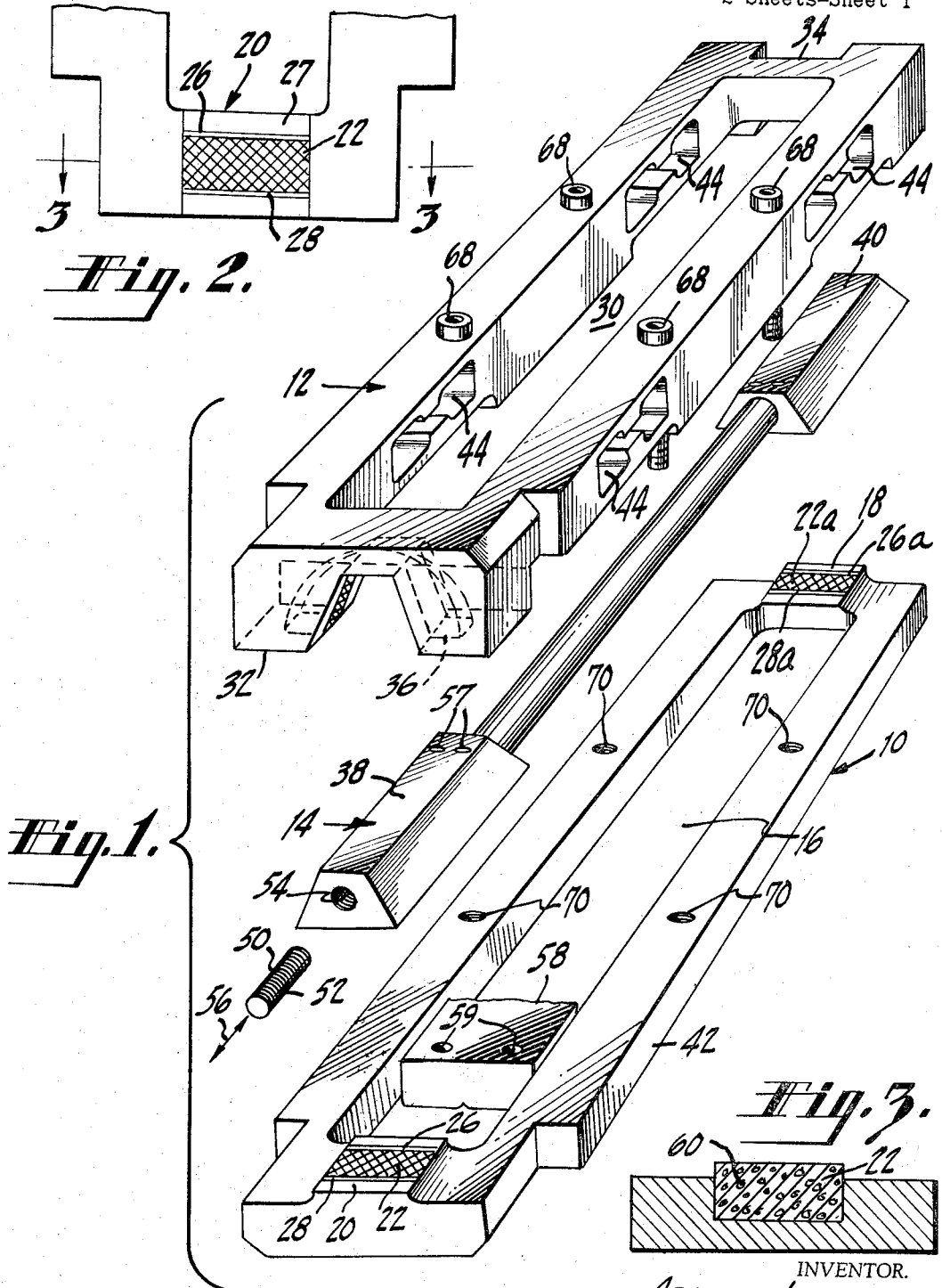
INVENTOR.
ABRAHAM LICHOWSKY
BY
Attorney

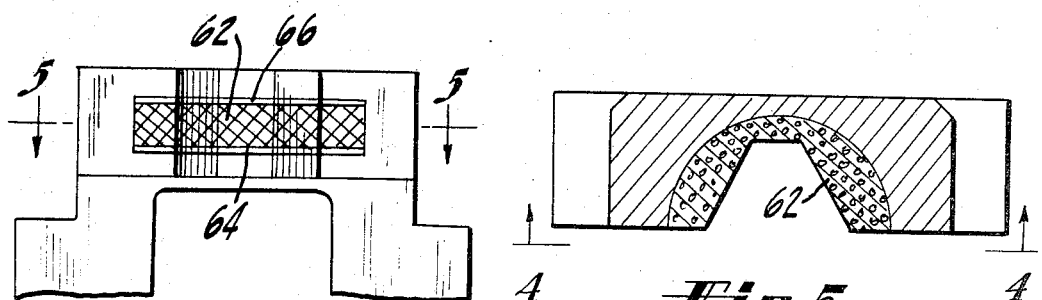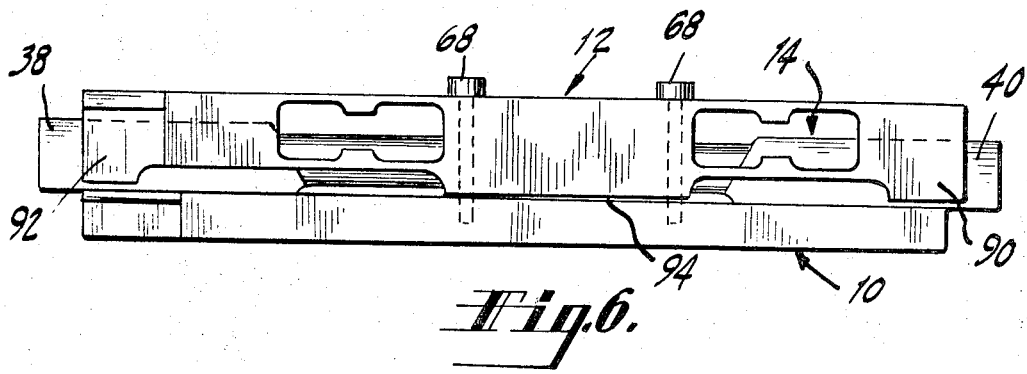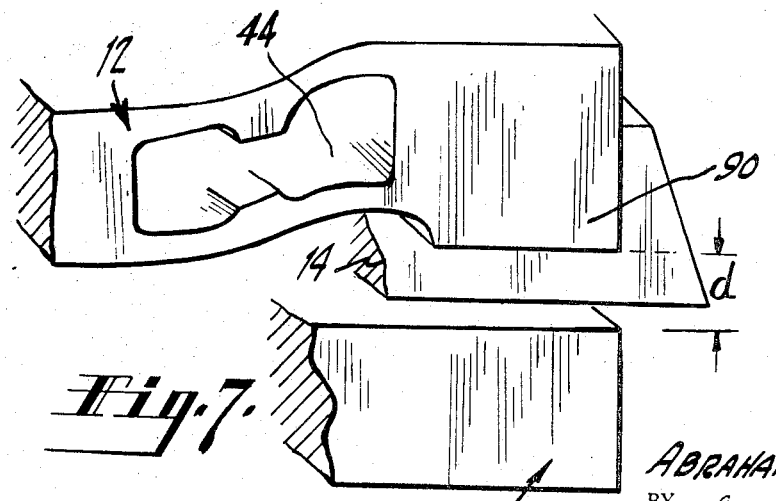

United States Patent Office 3,350,143
Patented Oct. 31, 1967

3,350,143
SLIDE BEARING EMPLOYING A FLUORO-
CARBON LUBRICANT
Abraham Lichowsky, Los Angeles, Calif., assignor to
Radio Corporation of America, a corporation of Delaware
Filed Mar. 17, 1965, Ser. No. 440,582
9 Claims. (Cl. 308—3)

ABSTRACT OF THE DISCLOSURE

High precision slide bearing suitable for applications such as the support of magnetic read/write heads. Includes a stationary element having a reference bearing surface formed of relatively porous metal such as sintered bronze, a movable element formed of relatively hard, relatively smooth metal such as steel, and a second stationary element serving the dual purpose of urging the movable element into engagement with the sintered bronze of the first element and constraining the movement of the movable element to a desired path. The lubricant employed is a fluorocarbon.

---

Fluorocarbons such as tetrafluoroethelene (sold under the trademark "Teflon" and so referred to in the following discussion) have excellent lubricating properties and previously have been proposed for use as bearing material. Unfortunately, however, Teflon also has a number of disadvantageous characteristics. It is a poor conductor of heat and it also has very poor dimensional stability. Accordingly, bearings made of Teflon have very limited load times velocity ratings, or tend to overheat and tend to deform or wear excessively, under load and in response to thermal and hygroscopic environmental variations, and with age.

An object of the present invention is to provide a slide bearing which is capable of high precision and which has long life.

Another object of the invention is to provide a slide bearing, the movable element of which can be driven, reproducibly, to any one of a number of predetermined positions.

Another object of the invention is to provide an improved slide bearing which is capable of operating at relatively high accelerations.

Another object of the invention is to provide a Teflon lubricated bearing having good heat conductivity, good dimensional stability, long life, and high precision.

The bearing of the invention includes a stationary element formed of a relatively porous metal, such as sintered bronze, and a movable element formed of a relatively hard, relatively smooth metal, such as steel. An insert, formed of a fluorocarbon such as Teflon, is located in a slot in the porous metal which opens on the surface against which the movable element bears. In a preferred form of the invention, the Teflon insert also includes some lead.

During the operation of the bearing described above, the friction of the movable element against the surface of the fixed element containing the Teflon insert wears away some of the Teflon. The Teflon wear particles become trapped in the small voids in the porous metal and act as a lubricant for the movable element. The porous surface provides the necessary mechanical support and dimensional stability for the Teflon and also provides the required heat conductivity. The lead, if employed, tends to smear into any imperfections which may be present on the working surface of the movable element and provides a smoother and consequently more frictionfree interaction between the movable element and the Teflon containing bearing surface.

The invention is discussed in greater detail below and is shown in the following drawings, of which:

FIGURE 1 is an exploded view of a slide bearing according to the invention;

FIGURE 2 is a plan view of the end portion of the base plate of the bearing;

FIGURE 3 is a cross-section along line 3—3 of FIGURE 2;

FIGURE 4 is a plan view of the end portion of the cap plate of the bearing of FIGURE 1;

FIGURE 5 is a section along line 5—5 of FIGURE 4;

FIGURE 6 is a side view of the bearing of the invention in its assembled condition; and FIGURE 7 is a side view of a portion of the bearing of FIGURE 6 showing, greatly exaggerated, the flexure of the end portion of the cap plate in the assembled condition of the bearing.

The bearing shown in FIGURE 1 consists of three parts; two of the parts, namely the base plate 10 and the cap plate 12, are fixed elements and the third part 14 is a movable element. The base plate 10 is formed with an oval-shaped slot 16 and with openings of rectangular cross-section at the opposite end portions 18 and 20 thereof. Inserts are located in these openings. The inserts include Teflon, shown cross-hatched at 22 and 22a, and preferably also include lead sheets 26, 28 and 26a, 28a as the exterior walls of the inserts. When the lead-Teflon inserts are in position, their upper surfaces are flush with the surrounding base plate surfaces.

The cap plate 12 is formed also with a central oval-shaped slot 30, and its opposite end portions 32 and 34 include slots of trapezoidal shape. These slots conform with the cross-section of the opposite end portions 38 and 40 of the movable element 14. The end portions 32 and 34 of the cap plate include Teflon-lead inserts, one of which is shown in phantom view at 36, which are similar in structure and have the same function as the base plate inserts. These and the base plate inserts are shown in greater detail in the other figures and are discussed in more detail later.

The cap and base plates 12 and 10 are made of a porous metal such as sintered bronze. The movable element 14 is made of a relatively smooth, relatively hard metal, such as steel.

In the assembled position of the three parts shown in FIGURE 1, the movable element 14 can be moved in the direction of its long axis. However, there is no clearance between the fixed elements 10 and 12 and the movable element 14, and there is no significant resiliency in the bearings except for the resilience of the end portions of cap plate 12 against the end portions of the movable element 14, as discussed later. The openings 44 in the cap plate are known as "parallelogram flexures," and their purpose is to preload the bearing without distorting the surface alignments and to absorb wear without permitting the bearing surfaces to cock (this is discussed later in connection with FIGURES 6 and 7).

There is also shown in FIGURE 1 an adjustable end cap (screw 50) which mates with a threaded opening in the movable element 14. In the operation of the bearing, the end cap is mechanically coupled to a drive mechanism (not shown) such as a hydraulically operated piston. In one practical system, the drive mechanism moves the end cap and movable element 14 in the direction of arrows 56 to one of sixteen different discrete positions during very short intervals and at resultant high accelerations (approximately 100 times gravitational acceleration).

The load 58 driven by the movable element 14 is located within the oval opening 16 in the base plate 10.

The load is secured to element 14 by small bolts 57 which screw into threaded openings 59 in the load. In one practical form of the invention, this load is a group of magnetic read-write heads within a single housing, illustrated in part at 58. The heads are movable with the element 14 to one of sixteen different discrete positions, corresponding to sixteen track positions on a magnetic storage medium (not shown) such as a plastic card coated with magnetic material. Their purpose is to read information from and write information on the storage medium as the medium is driven at high speed past the read-write heads.

An enlarged plan view of the end portion 20 of the base plate 10 appears in FIGURE 2. (It is similar in structure to the opposite end portion 18 of the base plate). The insert at this end portion consists of a center Teflon element 22 lined with lead sheets 26 and 28. The top surface of the Teflon-lead insert is flush with the raised sintered bronze surface 27. The Teflon is preferably formed with the relief perforations shown at 60 in FIGURE 3. Their purpose is to absorb volume and pressure variations which result from the basic instability of the Teflon.

FIGURES 4 and 5 are plan and cross-sectional views of the end portion 32 of the cap plate 12. (The opposite end portion 34 of the cap plate is similar and therefore is not shown separately.) The Teflon-lead insert is similar to the insert in the base plate and includes a Teflon center portion 62 and lead liners 64 and 66. As is clear from FIGURE 5, the insert is formed with a trapezoidal opening and the surfaces of the Teflon and lead defining this opening align with the immediately adjacent sintered bronze surfaces.

A side view of the bearing of FIGURE 1 in its assembled condition appears in FIGURE 6. The bolts 68 which pass through the cap plate 12 screw into the threaded openings (70 in FIGURE 1) in the base plate 10. The opposite end portions 90 and 92 of the cap plate are spaced a relatively small distance (approximately 0.020 inch in one particular design) from the base plate 10. However, the trapezoidal openings in the end plates abut the trapezoidal-shaped surfaces of the end portions 38 and 40 of the movable element 14. To achieve the appropriate amount of flexure of the cap plate and the proper amount of friction between the movable element 14 and the base and cap plates 10 and 12, shims are forced between the base plate and cap plate in the region indicated at 94.

An exaggerated showing of one end portion of the cap plate after appropriate shimming appears at 90. (The other end portion is similar and not shown.) As already mentioned, the clearance $d$ is only 0.02 inch and the distortion of the slot 44 is not easily visible to the naked eye. The slot 44 permits the cap plate to bend a slight amount, as shown greatly exaggerated in FIGURE 7. However, the end portion 90 remains parallel to the surface of the base plate 10 when the cap plate is in its bent condition. And, when the base plate and cap plate wear at the end portions thereof where the Teflon inserts are located, the cap plate continues to bear against the movable element 14 and there continues to be no clearance between the movable element and the cap plate and base plate.

The only variation in position which is possible of the end portions of the cap plate is in a direction perpendicular to the bearing surfaces of the base plate and, as already mentioned, the bearing surfaces of the cap plate remain parallel to the corresponding surfaces of element 14 during such a change in position. This variation in position, in practice, is very slight because of the very small amount of wear of the bearing surfaces and is readily calculable. On the other hand, because the initial contact between the movable and fixed bearing elements is metal-to-metal (steel-to-sintered bronze) and the Teflon very quickly works into the pores of the sintered bronze bearing surfaces, a break-in period is not required and the initial wear rates are exceptionally low.

In one practical arrangement, the bolts 68 and shims are initially adjusted so that about ten pounds of force are required to move the movable element. This, that is, the fact that there is some friction between the movable element 14 and the fixed elements 10 and 12, is a desirable feature in the present bearing, as it helps damp the system (minimizes "overshoots").

In the operation of the bearing, the movable element 14 can be driven in the direction of arrows 56 (FIGURE 1). The magnetic head which is secured to the movable element 14 moves with the element. The movement of the element 14 causes very small Teflon particles to become dislodged from the inserts. They cannot escape from the bearing without traversing a relatively large distance along the porous bronze surface. The voids in the bronze surface soon become covered by a thin layer of Teflon which acts as a very good lubricant. The rate of escape of the Teflon from the sintered bronze surface is very low, as the Teflon particles become imbedded in the tiny voids therein. This composite surface provides mechanical support, dimensional stability, and heat conductivity, properties absent from the Teflon itself. In addition, as the Teflon lubricating surface is very thin, there is no appreciable build-up of surface temperature, even though the Teflon itself is a relatively poor conductor of heat.

When the supply of lubricating particles diminishes to the point where lubrication approaches failure (and this is a very slow process), slight wear of the porous bronze base occurs, exposing a new supply of Teflon and lead. The Teflon particles again are captured in the pores of the sintered bronze surface forming a new, thin lubricating surface. A slight amount of the flexure in the cap plate is taken up and the cap plate continues to bear down on the movable element and continues to maintain its parallel relationship to the trapezoidal surfaces of the movable element. The surface build-up and break-down process, with time, approaches a state of relatively stable equilibrium.

It has been found, in practice, that the bearing described has very long life. (In a life test of five million cycles at 12 cycles (24 strokes) of 0.375 inch displacement per second, the bearing was found still to be useful and accurate—less than 0.0001 inch deviation in element 14 from its initial preset position.) The wear rates are extremely low; the load capacity is high; and the temperature rise due to the movement of the movable element is relatively low. Further, the provision of initial metal-to-metal contact in combination with the Teflon-lead insert or pellet, as shown, has been found to give exceptionally low initial wear rates—much lower than that of a bearing having a Teflon-lead layer initially between the two metal surfaces. Finally, as there are no clearances or backlash of any kind and as there are no moving parts other than the slider (element 14), the secondary dynamics problems usually associated with ball or roller slider bearings under high axial acceleration are avoided.

The combination of lead with Teflon, as shown and described, empirically has been found to give improved performance over the use of Teflon alone or with a number of other materials. The lead tends to smear into the imperfections in the hard steel movable element and, in this way, to provide a smoother working surface on the steel.

The bearing of the present invention has been illustrated in terms of driving a group of magnetic heads to one of a number of discrete positions. However, it is to be understood the invention is not limited to this specific use. For example, the drive means may be one of the continuous rather than the discrete position type and the load, of course, may be other than magnetic heads. Moreover, the hard metal employed need not be steel and the porous metal need not be bronze. Other metals of similar characteristics (one porous and the other relatively hard and smooth) are suitable, but steel and bronze are readily available, relatively inexpensive, relatively easy to machine and have been found to provide excellent performance.

What is claimed is:

1. A bearing comprising,
   a first element including a porous metal bearing surface in a fixed reference position and formed with an opening therein;
   a second element having a relatively hard, relatively smooth, metal bearing surface which engages the bearing surface of the first element, said second element being movable with respect to the first element;
   preloading means continuous resiliently urging the second element toward the first element; and
   an insert formed of a fluorocarbon having lubricating properties located in said opening in the bearing surface of the first element and abutting the second element.

2. A slide bearing comprising, in combination,
   a stationary bearing element formed with a sintered bronze reference bearing surface and having a slot opening on said surface;
   a lubricant comprising a fluorocarbon and lead located in said slot;
   a relatively smooth, movable steel element having a bearing surface which engages the sintered bronze bearing surface of the stationary bearing element; and
   means both continuously urging said steel element against said sintered bronze bearing surface and providing a channel which permits movement of the steel element along only a single path.

3. A slide bearing comprising, in combination,
   two stationary bearing elements formed with porous metal bearing surfaces, said bearing surfaces having slots opening thereon, and said two elements being joined to form an opening, surrounded by said bearing surfaces, adapted to receive a movable bearing element;
   a lubricant, comprising a lubricating fluorocarbon, located in the slots opening on the bearing surfaces and flush with said surfaces;
   a movable element having relatively hard, relatively smooth bearing surfaces which conform to and mate with the bearing surfaces defining the opening in the joined stationary bearing elements, located in said opening; and
   one of said stationary elements serving as a fixed reference and the other of said stationary elements continuously resiliently urging the movable element into engagement with said one stationary element.

4. A slide bearing comprising, in combination,
   two elongated stationary bearing elements, each formed with porous metal bearing surfaces at an end portion thereof, each having a slot opening on the bearing surface, said two elements being joined at a region thereof spaced from said end portion to form an opening, at said end portion, surrounded by said bearing surfaces, adapted to receive a movable bearing element, one of said stationary bearing elements being formed with a region of relatively small cross-sectional area between the end portion thereof and the region where the two elements are joined to thereby permit flexure of said one element and the other said element being relatively rigid;
   a lubricant, comprising a lubricating fluorocarbon, located in the slots opening on the bearing surfaces and flush with said surfaces; and
   a movable element having relatively hard, relatively smooth, bearing surfaces which conform to and mate with the bearing surfaces defining the opening in the joined stationary bearing elements, and having a cross-section of slightly larger size than said opening so as slightly to flex said one element when in place in said opening, located in said opening.

5. A slide bearing comprising, in combination,
   two elongated stationary bearing elements, each formed with porous metal bearing surfaces at an end portion thereof, each having a slot opening on the bearing surface, said two elements being joined at a region thereof spaced from said end porton to form an opening, at said end portion, surrounded by said bearing surfaces, adapted to receive a movable bearing element, one of said stationary bearing elements being formed with an opening therein to thereby provide a region of relatively small cross-sectional area between the end portion thereof and the region where the two elements and the other said element being relatively rigid are joined to thereby permit flexure of said one element;
   a lubricant, comprising a lubricating fluorocarbon, located in the slots opening on the bearing surfaces; and
   a movable element having relatively hard, relatively smooth bearing surfaces which conform to and mate with the bearing surfaces defining the opening in the joined stationary bearing elements, and having a cross-section of slightly larger size than said opening so as slightly to flex said one element when in place in said opening, located in said opening.

6. A slide bearing comprising, in combination,
   two elongated stationary bearing elements, each formed with porous metal bearing surfaces at opposite end portions thereof, each element having slots opening on its bearing surfaces, said two elements being joined at the center region thereof to form openings at the end portions thereof, surrounded by said bearing surfaces, adapted to receive a movable bearing element, one of said stationary bearing elements being formed with regions of relatively small cross-sectional area between the respective end portions and the center region thereof, to permit the one element resiliently to bend at the regions thereof of restricted cross-section and the other said element being relatively rigid;
   a fluorocarbon insert located in each said slot for lubricating said bearing surfaces; and
   an elongated movable element having relatively hard, relatively smooth, metal bearing surfaces at opposite end portions thereof which respectively conform to and mate with the bearing surfaces defining the openings at the opposite end portions of the joined stationary bearing elements, and having cross-sections of slightly larger size than said openings so as slightly to flex said one element when in place in said openings, positioned between the two stationary bearing elements with its opposite end portions in the respective openings formed in the end portions of the joined stationary bearing elements.

7. A slide bearing as set forth in claim 6 wherein the regions of relatively small cross-section are regions of the one bearing element formed with elongated openings therethrough having a length dimension parallel to the axis of the stationary element and a shape to permit flexure of the one element without affecting the angular position of the bearing surfaces at the end portions of the one bearing element.

8. A slide bearing, comprising:
   an elongated first stationary bearing element formed with a flat, porous metal, bearing surface, and having a slot opening on said surface;
   an elongated element, movable in the direction of the length dimension thereof, arranged with its length dimension parallel to the length dimension of the first stationary bearing element, and one portion of which is surrounded by a plurality of flat, relatively hard, relatively smooth, bearing surfaces, one of said surfaces engaging the bearing surface of the first stationary bearing element;

an elongated second stationary bearing element, arranged with its length dimension parallel to the length dimension of the first stationary bearing element, formed at one region thereof with flat, porous metal, bearing surfaces which conform to and mate with the remaining flat bearing surfaces of the movable element, and joined to the first stationary element at a second region thereof, said second stationary bearing element being formed with an elongated opening therein in a third region thereof between the first and second regions which extends through opposite surfaces thereof which are substantially perpendicular to the bearing surface of the first stationary element, said opening having a length dimension parallel to that of the second element, said second element being flexed at the third region thereof in a sense resiliently to urge its bearing surfaces against the corresponding bearing surfaces of the movable element, and said second element being formed with at least one slot which opens on the bearing surfaces thereof; and a lubricating fluorocarbon in said slots.

9. A slide bearing, comprising:

an elongated first stationary bearing element formed with a flat, porous metal, bearing surface, and having a slot opening on said surface;

an elongated element, movable in the direction of the length dimension thereof, arranged with its length dimension parallel to the length dimension of the first stationary bearing element, one portion of which is of trapezoidal cross-section and is surrounded by four flat, relatively hard, relatively smooth, bearing surfaces, the surface corresponding to the longer of the two parallel sides of the trapezoid engaging the flat bearing surface of the first stationary bearing element;

an elongated second stationary bearing element, arranged with its length dimension parallel to the length dimension of the first stationary bearing element, formed at one region thereof with three flat porous metal bearing surfaces which conform to and mate with the three remaining flat bearing surfaces of the movable element, and joined to the first stationary element at a second region thereof, said second stationary bearing element being formed with an elongated opening therein in a third region thereof between the first and second regions which extends through opposite surfaces thereof which are substantially perpendicular to the bearing surface of the first stationary element, said opening having a length dimension parallel to that of the second element, said second element being flexed at the third region thereof in a sense resiliently to urge its bearing surfaces against the corresponding bearing surfaces of the movable element, and said second element being formed with at least one slot which opens on the bearing surfaces thereof; and fluorocarbon-lead inserts in said slots.

References Cited

UNITED STATES PATENTS

| | | | |
|---|---|---|---|
| 813,041 | 2/1906 | Demarest | 308—4 |
| 2,342,946 | 2/1944 | Le Tourneau | 308—3 |
| 2,704,234 | 3/1955 | Love. | |
| 2,743,966 | 5/1956 | McKerman | 308—239 X |
| 2,852,322 | 9/1958 | Fisher | 308—240 X |
| 2,916,226 | 12/1959 | McGraw. | |
| 2,989,355 | 6/1961 | Torhorst. | |
| 3,105,723 | 10/1963 | Hamaker | 308—3 |
| 3,115,696 | 12/1963 | Evans | 308—3 X |
| 3,149,543 | 9/1964 | Naab | 92—155 |
| 3,160,376 | 12/1964 | Kennedy | 308—3 X |
| 3,212,827 | 10/1965 | Brettrager | 308—3 |
| 3,233,376 | 2/1966 | Naillon | 308—3 |
| 3,261,613 | 7/1966 | Norick | 277—188 X |

FOREIGN PATENTS 850,756 10/1960 Great Britain.

MARTIN P. SCHWADRON, *Primary Examiner.*

L. L. JOHNSON, *Assistant Examiner.*

UNITED STATES PATENT OFFICE
CERTIFICATE OF CORRECTION

Patent No. 3,350,143                          October 31, 1967

Abraham Lichowsky

It is hereby certified that error appears in the above numbered patent requiring correction and that the said Letters Patent should read as corrected below.

Column 6, lines 15 and 16, strike out "and the other said element being relatively rigid" and insert the same after "element" in line 17, same column 6.

Signed and sealed this 19th day of November 1968.

(SEAL)
Attest:

Edward M. Fletcher, Jr.                          EDWARD J. BRENNER
Attesting Officer                                   Commissioner of Patents